UNITED STATES PATENT OFFICE.

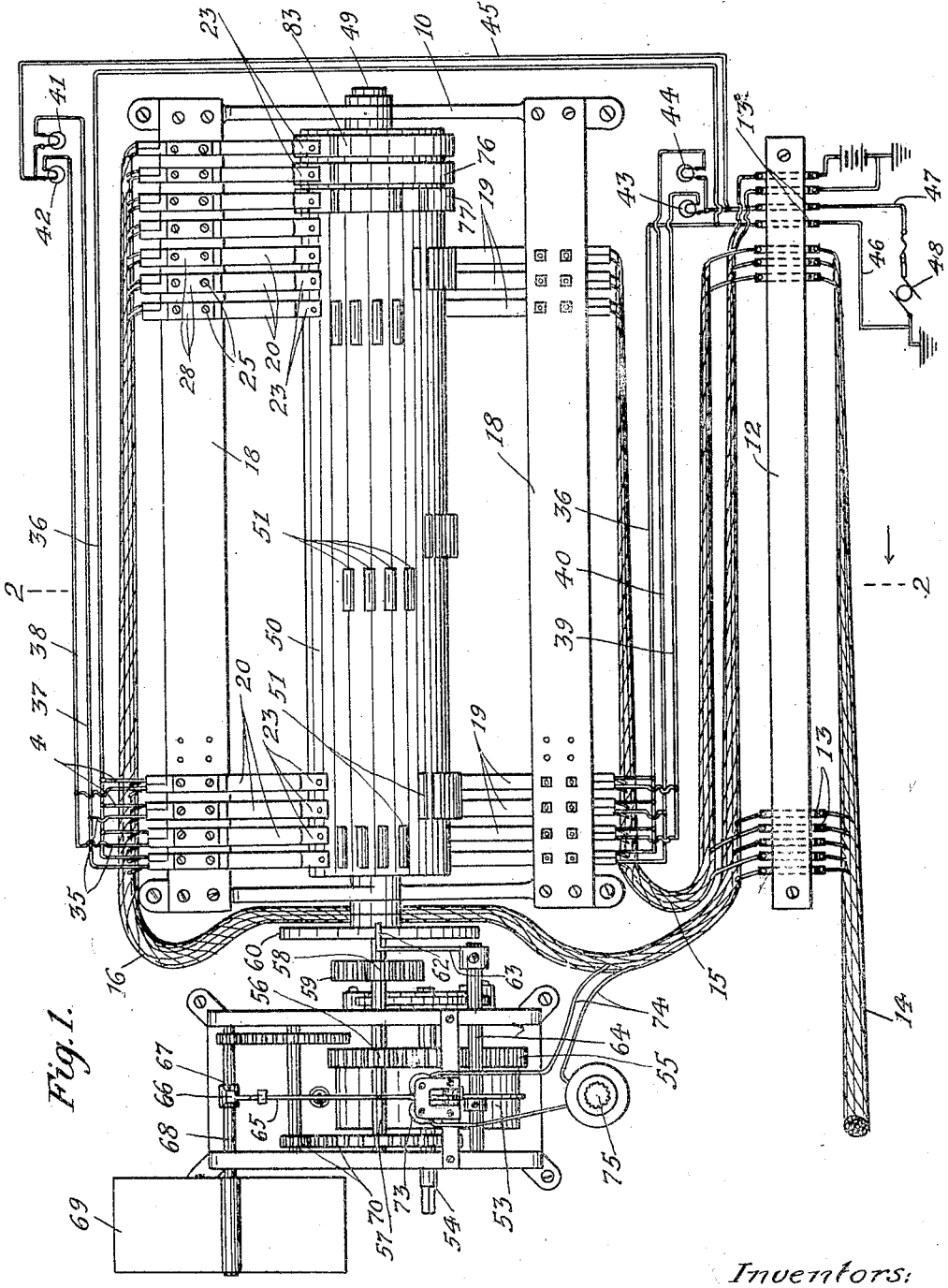

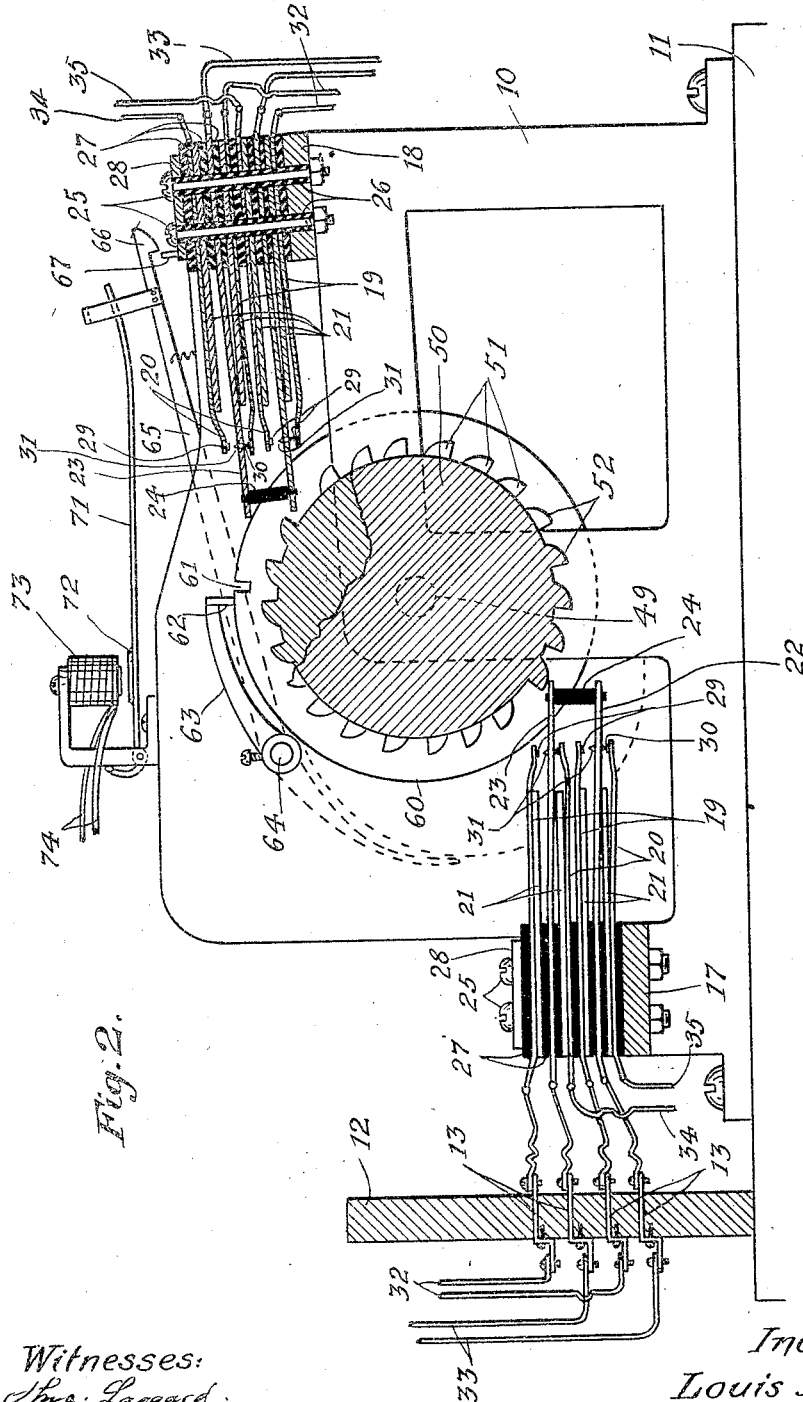

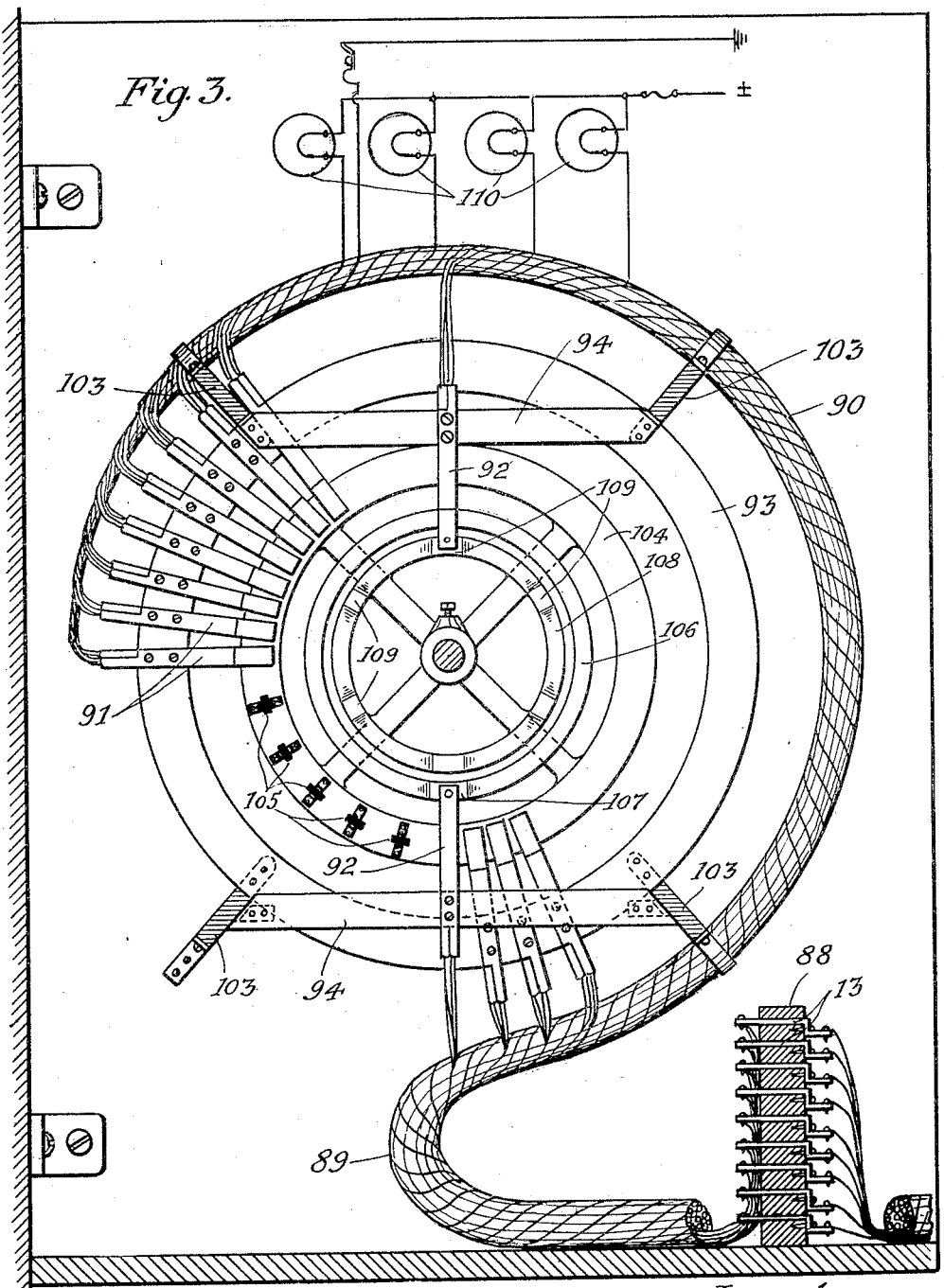

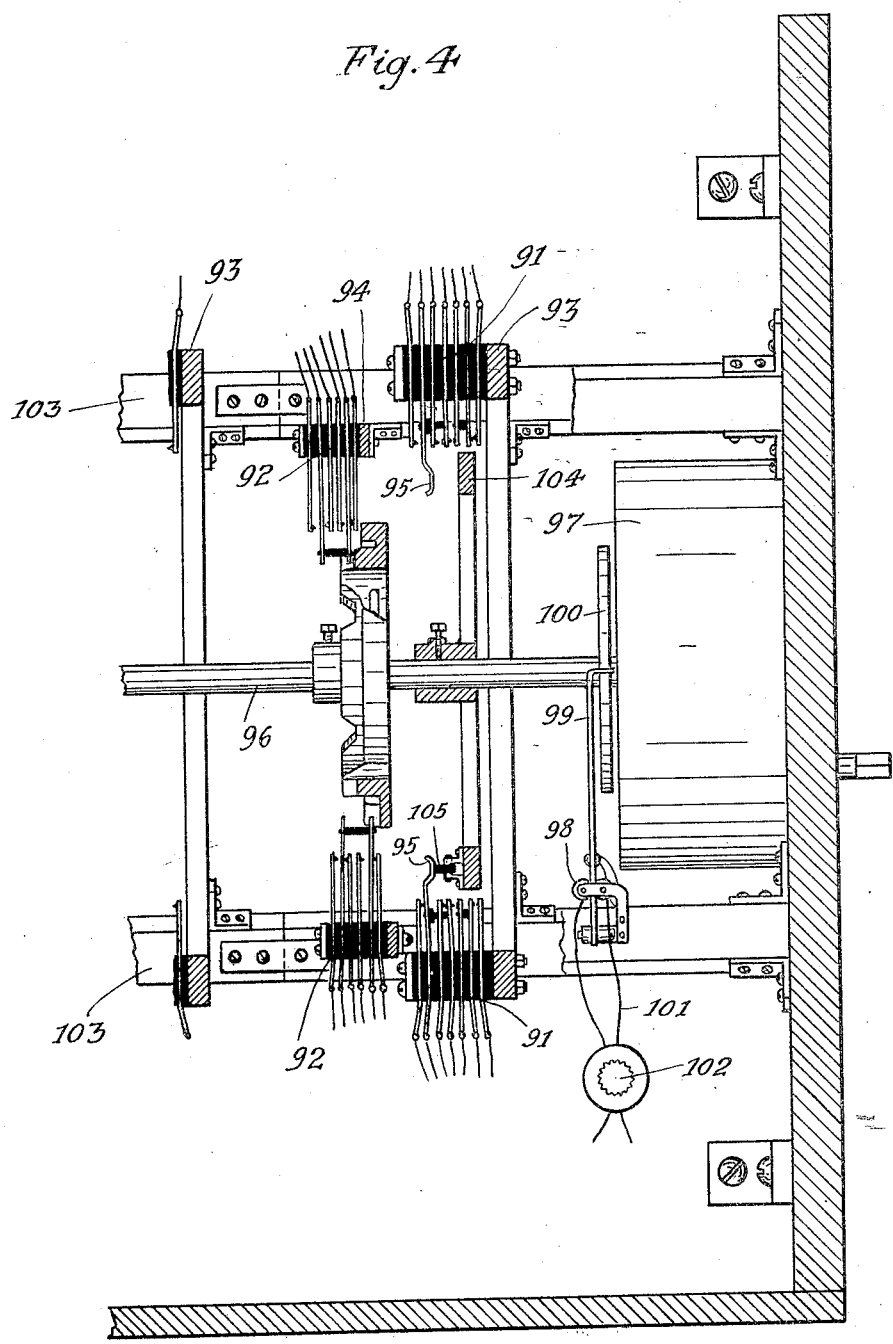

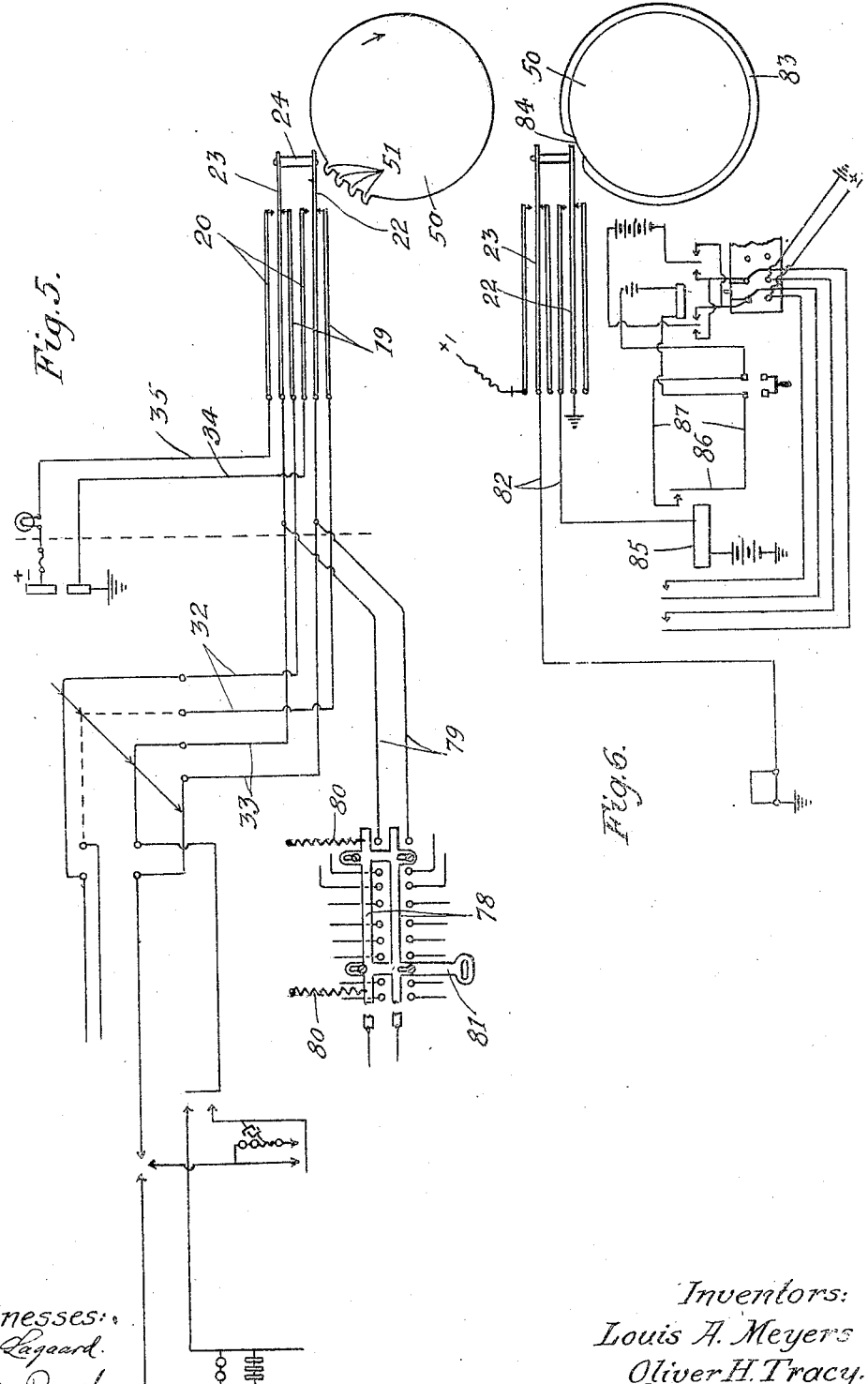

LOUIS A. MEYERS, OF SAUK CENTER, MINNESOTA, AND OLIVER H. TRACY, OF PLAZA, NORTH DAKOTA.

ALARM SIGNALING APPARATUS.

1,113,460.  Specification of Letters Patent.  Patented Oct. 13, 1914.

Application filed February 21, 1914. Serial No. 820,328.

*To all whom it may concern:*

Be it known that we, LOUIS A. MEYERS and OLIVER H. TRACY, citizens of the United States, residing at Sauk Center, Stearns county, Minnesota, and at Plaza, in the county of Mountrail and State of North Dakota, respectively, have invented certain new and useful Improvements in Alarm Signaling Apparatus, of which the following is a specification.

Our invention relates to an alarm-signaling apparatus, and has for its object to provide improved and efficient means for application in telephone exchanges which, using the bell circuits of such exchanges, shall operate automatically to ring the telephone bells in a number of separated rooms or buildings, as, for example, all of the bells in the rooms of a hotel or the telephone bells in the rooms of the various members of a volunteer fire company.

The full objects and advantages of our invention will appear in connection with the detailed description thereof and are particularly pointed out in the claims.

In the drawings, illustrating the application of our invention in one form, Figure 1 is a view of an apparatus embodying the features of our invention. Fig. 2 is a sectional elevation on line 2—2 of Fig. 1. Fig. 3 is a front elevation view, and Fig. 4 a side sectional view of a modified form of our invention showing the use of a rotary member in the form of a disk or ring, rather than a roll or cylinder, as in the form of Figs. 1 and 2. Figs. 5 and 6 are diagrams illustrating the circuits effected and controlled by our apparatus.

Our machine comprises a frame 10 on a base 11, on which is secured a connecting rack 12 of any well-known construction, said rack comprising the requisite number of connecting members 13 for connecting the telephone line wires with the circuit wires of our machine, as illustrated in Fig. 1. Said line wires may advantageously be brought in in a cable 14 and the wires distributed to the connecting members 13 on the connecting rack 12. And from the said connecting members 13 a series of wires will be led by means of two cables 15 and 16 to requisite connections with an assemblage of contacts, which will now be described. These contacts preferably consist of spring fingers secured in proper manner upon assembly bars 17 and 18, bar 18 being mounted on frame 10 in a plane higher or spaced from the plane of bar 17 for a purpose which will later be explained. The contact plates are secured upon the assembly bars in the same manner for all of said sets of bars. These contact members comprise two pairs of spring fingers 19 and 20, respectively, alternately arranged, each reinforced by stiffener plates 21 and a pair of contact springs 22 and 23 mounted to move between the ends of pairs of contacts 19 and 20 and held to move in unison by means of an insulating spacer 24. For reasons that will later appear, the spring fingers 19 carried by the lower assembly bar 17 are the top members of the respective bars of springs 19, 20, while the spring fingers 19 carried by assembly bar 18 are the lower members of the bars of spring fingers 19, 20. All of these plates or springs are assembled upon the assembly bars 17 and 18 by means of screw bolts 25 surrounded by insulating sleeves 26 with insulating strips 27 between the various springs or contact members, a top metal strip 28 serving as a washer and to give binding support to the screws 25. Each of spring plates 19 and 20 is provided with a platinum contact 29, and each of contact springs 22 and 23 is provided with oppositely-extended contact points 30 and 31, respectively. The contact plates 22 and 23 are normally so positioned that the upper contact points 31 of those arranged on the lower assembly bar 17, and the lower contact points 30 of those arranged on the upper assembly bar 18, will be in contact with the contacts 29 of the spring members 19, respectively above or below said sets of spring fingers 22 and 23. If the contact fingers 22, 23 are moving a short distance from this normal position the contact points 30 will be withdrawn from springs 19, and the contact points 31 will be caused to engage springs 20.

The respective pairs of springs 19 are connected through connectors 13 with line wires 32, while plates 22 and 23 are connected through connectors 13 with line wires 33, the normal position of these members, therefore, providing a complete circuit through which the ordinary operation of the telephone, ringing, talking, etc., takes place. The spring fingers 20 are connected by wires 34 and 35 with a ringing circuit, as will now be described. All of wires 34 are connected with a single circuit wire 36. The alternating wires 35 on one side of the machine are connected to two circuit wires 37 and 38, respectively; while the alternating wires 35 at the other side of the machine are connected to two circuit wires 39 and 40, respectively. The circuit wires 37, 38, 39 and 40 each connects through resistance lamps 41, 42, 43 and 44, respectively, with a common circuit wire 45. Through connectors 13, the wires 36 and 45 connect with the main ringing circuit wires 46 and 47 operated by a pole changer or interrupter 48. If now means are provided for moving any desired number of contact springs 22, 23 so as to break contact with the line circuit and make contact with the ringing circuit, it is apparent that all of the telephone bells of the lines affected will be simultaneously rung. As above pointed out, the assembly bars 17 and 18 are arranged in different planes, and, as shown, they are positioned at opposite sides of the machine so that the assemblage of contact members carried thereby extends inwardly, the spring fingers 22, 23 projecting a suitable distance beyond the other contact members. Fixed upon a shaft 49, journaled in bearings in the frame 10, is a roller 50 provided with a plurality of series of projections or cam members 51, preferably formed with beveled or rearwardly curved surfaces 52. Said members 51 are each of a width and so extended that as roller 50 is rotated the members 51 will engage a pair of contacts 22, 23; and the various series of cams 51 are arranged along the cylinder 50 in staggered relation, so that at any one time a determined number only of pairs of contacts will be actuated. This number, as shown, being three pairs at any one time. Furthermore, as indicated in Fig. 2, the cams are so arranged that the pairs of contacts at opposite sides of the rollers, supported by assembly bars 17 and 18, may alternately be operated, although, if desired, the pairs of contact springs on opposite sides of the rollers may be simultaneously operated. In any event, in the structure shown but four resistance lamps are necessary for protecting the switchboard and to insure against grounds; for, in case of any ground, it could, at most, affect only the three bells to be rung on the circuit passing through the one resistance lamp. This refers to the grounds which frequently take place on line wires of the system. Such a ground may occur at a point between the bell of any telephone and the switchboard, in which case the bell will not ring. Resistance lamps are provided to protect the pole changer which otherwise might be short circuited by a line ground and damaged or destroyed.

For driving the roller 50, we provide a motor of any desired construction, which may comprise a spring 53 to be wound by means of a stem 54, a gear 55 connected with said spring and operating a pinion 56 on a shaft 57. The shaft 57 is provided with a pinion 58 meshing with a gear 59 fast on the shaft of roller 50, by which means said roller is turned. Fast with roller 50 is a disk 60 having therein a notch 61, into which a catch 62 on an arm 63 may drop. The arm 63 is fast on a rock-shaft 64, which also has another arm 65 formed of a hook 66 adapted to engage a catch 67 on a shaft 68, the shaft 68 having thereon a fan governor 69 and being operated by gear 70 from shaft 57. The arm 65 has connected therewith a pivoted link 71 having thereon an armature 72 in a position to be attracted by relay 73. The relay 73 is connected in a circuit 74 controlled by a push button 75 on the machine or elsewhere. By means of push button 75, the circuit 74 may be closed, energizing relay 73 and thereby lifting catches 62 and 67, when the spring will operate the roller or drum 50 and turn the same through one complete revolution, disk 60 in coöperation with catch 62 holding the catch 67 in inoperative position until the revolution of roller 50 has been completed, when the catch 62 will drop into notch 61 and operation of the machine be terminated. It will be apparent that if desired gearing may be employed such that the roller may be rotated a greater or less number of times than control disk 60, so that the operation of the machine may be shortened or prolonged as conditions of service may require. During the rotation of the roller the various sets of cams 51 will actuate the spring fingers 22, 23 so as to make and break ringing connections the desired number of times through all of the lines connected with the apparatus. As shown, this making and breaking is effected four times for each revolution of the roller. In addition to a circuit closer on the machine itself or available for the use of the operator at the telephone exchange, it is obvious that a multiple circuit may be employed and circuit closers distributed at various points in the town, preferably in cases cut of doors, which may be broken by the watchman or any person who has discovered a fire and the apparatus automatically started to send out the alarms, as is true of fire-alarm signaling-service to the various stations of city systems. A special disk or cam member 76 is provided on roller 50 which controls a special circuit designed to set in operation mechanism for ringing an outside alarm. Another cam 77 may be employed for ringing special or ward alarms, all, of course, operated from the common roller 50.

The relation of the several circuits is shown quite clearly in the diagram of Fig. 3. This diagram also illustrates a device for establishing simultaneous talking connection with all of the telephones in circuit with the machine. This comprises a common, double bus-bar 78 adapted to close contacts by means of branch circuits 79 running to the various line circuits 32. The busbar 78 is slidably mounted and held by means of springs 80 in non-contacting position. A handle 81 is adapted to be grasped by the operator, who may draw down the double bus-bar 78, thereby simultaneously closing all of the branch circuits 79 with all of the line circuits 32, when the operator may simultaneously talk through all of the telephones in the system and advise the different parties of the location of the fire.

In the operation of the smaller exchanges it is a common practice to switch off the current from the pole changer or interrupter mechanism 48 at certain periods, connection to be made by hand when ringing occurs. Under such conditions it would be essential that our signaling system shall have means for automatically establishing the current through the pole changer when the machine is started. We accomplish this through a special circuit 82 operated by members 22, 23 and a special cam member 83 on cylinder 50. Said cam member, as shown in Fig. 4, comprises an annular, raised portion and a single notch 84 corresponding in position to the inoperative position of roller 50. Circuit 82 includes a relay 85, which through armature 86 closes the circuit 87 for supplying current to the pole changer.

In the modification illustrated in Figs. 3 and 4, a disk or ring, or series of rings is employed to operate the movable contact springs in place of a roller or cylinder, as is shown in the other forms. A connecting rack 88 is provided with connecting members 13, and in this form all of the wires of the system are brought together in a cable 89, which is extended in a circle 90, as illustrated, and from which the wires lead to systems of spring contacts 91 or 92 mounted upon circular assembly bars 93 and straight bars 94, the assembly bars 93 and 94 preferably being in vertical planes, as indicated. The sets of spring contacts 91 and 92 may be in all respects like those described in reference to the forms shown in Figs. 1 and 2, and the contact members 92 are so shown. Members 91 comprise a slightly different form, in which one of the spring members has an extended portion 95 in the path of engaging members on the disk hereinafter to be described.

Journaled in the frame of the machine is a horizontal shaft 96 operated in any desired manner by a spring motor 97, said spring motor being controlled from a relay 98 and finger 99 engaging a disk 100 and controlled by a circuit 101 through push button 102, in general similar to that described in reference to the structure of Figs. 1 and 2. It is to be noted that the assembly ring 93 and assembly bars 94 are carried by horizontal frame pieces 103, which bars are parallel with the shaft 96. The shaft 96 has thereon a disk or wheel ring 104, said ring being provided with a series of devices for engaging the spring extensions 95. These members may be any form of cam device, and, as shown, comprise a series of rollers 105 journaled upon the ring 104, said rollers preferably being of non-conducting material. The contacts 92 are preferably special contacts for controlling ward alarm, pole changer circuit, etc., corresponding to similar elements shown in Figs. 1 and 2. Special disks 106, with only one depressed portion 107, and disk 108, with a series of depressed portions 109, correspond in function with disks 77 and 83 of Figs. 1 and 4. It will be apparent, as is clearly indicated in Fig. 4, that the assembly rings 93 may be duplicated along the frame members 103, each of said assembly rings carrying its quota of contact members 91, operating disks or rings 104 being correspondingly positioned along shaft 96 so that as great a number of separate circuits as may be desirable may be operated in one machine. A series of resistance lamps 110 may be provided to be connected with members 91 in successive groups so that only a given number of ringing connections will be made through any one resistance lamp at a given time, the operation in this respect being similar to that of the resistance lamps 41, 42, 43 and 44, shown in Fig. 1.

The utility of our invention and its practicability for use in established telephone exchanges will be apparent. The machine can be introduced into a telephone exchange and the line wires of the telephones of the various members of the volunteer fire company of the town or city connected with the machine with perfect facility. The ordinary operation of the telephone exchange, as respects these line wires, will in nowise be affected, although talking and ringing will be carried on over the connected lines through the machine. Since these connections are effected by platinum contacts on double reinforced spring members which are movable only at their contacting ends, no trouble can be experienced from this source. Ringing contacts, as has already been pointed out, are made in pairs of circuits alternately connected with resistance lamps for either bank of spring contacts, so that at most, where, as shown, twelve rings are sent simultaneously, only three of said rings will be sent through any one resistance lamp, and that number only could be affected by a ground or trouble on any one line; and at the same time only four resistance lamps are employed for the entire machine. The motor employed is an ordinary spring motor of comparatively simple construction and is perfectly and efficiently controlled by the simple relay employed. The rotary movement of the roller 50 through the cams 51 effects the necessary movement of spring members 22, 23 to bring about closing of the ringing circuits with very little friction and absolute accuracy. The staggering of the sets of cams 51 on roller 50, as above pointed out, prevents undue strain upon the current supply for the pole changer and also makes practicable the arrangement of the contacts so that ringing of a large number of such contacts may be effected through a limited number of resistance lamps with no more than three circuits operating through any one lamp at a given time. The construction is thoroughly practical and meets the requirements of telephone service exchanges in all particulars.

Although we have referred to the use of our device as being associated with a telephone system and the circuits of such a system, and it is probably true that the device of our invention may find its largest use in that connection, it will nevertheless be obvious that this device may be applied to any system of wiring designed for the purpose of sending signals from some common point to a plurality of separated points, as, for example, an annunciator system such as is employed in hotels and factories.

The specific character of the system of circuits to which our invention is applied is not material except that the apparatus of our invention is specifically designed to be embodied in such a system, as, for example, a telephone system, and to perform these functions when called upon in connection with such system, without in any way interfering with the normal operation or endangering the operating parts of such established system.

We claim:

1. An automatic telephone-signaling machine comprising a plurality of sets of pairs of contact springs, one set being connected in line circuits and the other set in ringing circuits of the telephone system, a plurality of pairs of movable contacts connected in the line circuits of the telephone system and normally held so as to close said line circuits, a cylindrical member rotatably mounted in proximity with said movable contacts, means on the cylindrical member to engage said contacts and move them to break the line circuits and close the ringing circuits, and means to rotate the cylindrical member.

2. An automatic telephone-signaling machine comprising a plurality of sets of pairs of contact springs, one set being connected in line circuits and the other set in ringing circuits of the telephone system, a plurality of pairs of movable contacts connected in the line circuits of the telephone system and normally held so as to close said line circuits, said movable contacts having projecting portions extending in a common plane, a cylindrical member rotatably mounted in proximity with said extended portions, cams on the cylindrical member engageable with the extended portions when the cylindrical member is rotated to move said contacts and break the line circuits and close the ringing circuits, and means to rotate the cylindrical member.

3. An automatic telephone-signaling machine comprising a plurality of sets of pairs of contact springs, one set being connected in line circuits and the other set in ringing circuits of the telephone system, a plurality of pairs of movable contacts connected in the line circuits of the telephone system and normally held so as to close said line circuits, said movable contacts having projecting portions extending in a common plane, a cylindrical member rotatably mounted in proximity with said extended portions, cams on the cylindrical member engageable with the extended portions when the cylindrical member is rotated to move said contacts and break the line circuits and close the ringing circuits, each of said cams being of such width as to simultaneously engage a fixed number greater than one of said extended portions, and means to rotate the cylindrical member.

4. An automatic telephone-signaling machine comprising a plurality of sets of pairs of contact springs, one set being connected in line circuits and the other set in ringing circuits of the telephone system, a plurality of pairs of movable contacts connected in the line circuits of the telephone system and normally held so as to close said line circuits, a device mounted for rotation in proximity to parts of said movable contacts, means on and movable with said device to engage said contacts and move them to break the line circuits and close the ringing circuits, and means to rotate the device.

5. An automatic telephone-signaling machine comprising a plurality of sets of pairs of contact springs, one set being connected in line circuits and the other set in ringing circuits of the telephone system, a plurality of pairs of movable contacts connected in the line circuits of the telephone system and normally held so as to close said line circuits, a device mounted for rotation in proximity to parts of said movable contacts, means on and movable with said device to engage said contacts and move them to break the line circuits and close the ringing circuits, means to rotate the device continuously, controllable means to render said rotating means operative, and means automatically terminating the action of said rotating means after a predetermined number of rotations of the device.

6. In combination with a telephone system and a plurality of ringing and line circuits thereof, two series of fixed and separated contact members connected in the line circuits and ringing circuits, respectively, a series of movable contact members associated with said fixed members and acting in one position to close the line circuits and in another position to close the ringing circuits, means normally holding said movable members in position to close the line circuits, a rotatable member, a plurality of sets of devices on the rotatable member engageable with the movable contacts when said member is rotated to move said contacts to close and break the ringing circuits a determined number of times during a complete revolution of the rotary member, means to rotate said member, controllable means for rendering said rotatable means operative, and automatic means for terminating said operation when said member has been turned through a complete revolution.

7. In combination with a telephone system and a plurality of ringing and line circuits thereof, two series of fixed and separated contact members connected in the line circuits and ringing circuits, respectively, a series of movable contact members associated with said fixed members and acting in one position to close the line circuits and in another position to close the ringing circuits, means normally holding said movable members for closing the line circuits, said movable members having extended portions arranged so that pairs thereof will be in common planes, a rotatable member, a plurality of sets of cams on the rotatable member, each adapted to engage and operate a pair of said movable contacts when said member is rotated to close and break the ringing circuits a determined number of times during the complete revolution of the rotary member, a pair of resistance lamps, and means connecting the members of each pair of contacts with the ringing circuits through different ones of said resistance lamps.

8. In combination with a telephone system and a plurality of ringing and line circuits thereof, two series of fixed and separated contact members connected in the line circuits and ringing circuits, respectively, a series of movable contact members associated with said fixed members and acting in one position to close the line circuits and in another position to close the ringing circuits, means holding said movable members for normally closing the line circuits, a rotary member, a plurality of sets of cams on said rotary member engageable with the movable contacts when said member is rotated to move said contacts to close and break the ringing circuits a determined number of times during the complete revolution of the rotary member, said sets of cams being arranged in staggered relation so that only a determined number of said movable members will be operated simultaneously, and means to rotate the cam member.

9. In combination with a telephone system and a plurality of ringing and line circuits thereof, said ringing circuits being connected in multiple alternately through one or the other of two resistance lamps, and said resistance lamps, two series of fixed and separated contact members connected in the line circuits and ringing circuits, respectively, a series of movable contact members associated with said fixed members and acting in one position to close the line circuits and in another position to close the ringing circuits, means holding said movable members for normally closing the line circuits, a rotary member, means on the rotary member to simultaneously engage pairs of said contacts when said member is rotated and move the contact to break the line circuits and close pairs of ringing circuits, respectively connected through separate resistance lamps, and means to rotate the member.

10. In combination with a telephone system and a plurality of ringing and line circuits thereof, said ringing circuits being connected in multiple alternately through one or the other of two resistance lamps, and said resistance lamps, two series of fixed and separated contact members connected in the line circuits and ringing circuits, respectively, a series of movable contact members associated with said fixed members and acting in one position to close the line circuits and in another position to close the ringing circuits, means holding said movable members for normally closing the line circuits, a rotary member, means on the rotary member to simultaneously engage pairs of said contacts when said member is rotated and move the contacts to break the line circuits and close pairs of ringing circuits, respectively connected through separate resistance lamps, said engaging members being arranged in sets in staggered relation so that only a determined number of pairs of movable contacts will be operated simultaneously, and means to rotate the member.

In testimony whereof we affix our signatures in presence of two witnesses.

LOUIS A. MEYERS.
OLIVER H. TRACY.

Witnesses:
H. A. BOWMAN,
F. A. WHITELEY.